United States Patent
Müller

[11] Patent Number: 6,069,226
[45] Date of Patent: *May 30, 2000

[54] PROCESS FOR THE PREPARATION OF POLYTETRAMETHYLENE ETHER GLYCOL DIESTER USING AN ALUMINOSILICATE TYPE CATALYST

[75] Inventor: Monika Müller, Frankenthal, Germany

[73] Assignee: BASF Aktiengesellschaft, Ludwigshafen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/954,855

[22] Filed: Oct. 21, 1997

Related U.S. Application Data

[62] Continuation of application No. 08/839,905, Apr. 18, 1997, which is a continuation of application No. 08/387,828, filed as application No. PCT/EP93/02375, Sep. 3, 1993.

[30] Foreign Application Priority Data

Oct. 6, 1992 [DE] Germany .............. 42 33 503
Oct. 6, 1992 [DE] Germany .............. 42 33 502
Sep. 4, 1997 [DE] Germany .............. 42 29 489

[51] Int. Cl.$^7$ ............ C08G 63/00; C07C 43/11
[52] U.S. Cl. ............ 528/271; 524/730; 524/731; 524/845; 524/81; 560/240; 568/617
[58] Field of Search ............ 528/271; 524/73 D, 524/81, 731, 845; 560/240; 568/617

[56] References Cited

U.S. PATENT DOCUMENTS

| | | | |
|---|---|---|---|
| 4,303,782 | 12/1981 | McHale et al. | 528/416 |
| 4,480,124 | 10/1984 | Mueller | 560/248 |
| 4,608,422 | 8/1986 | Mueller | 525/410 |
| 5,112,943 | 5/1992 | Mueller | 528/483 |
| 5,208,385 | 5/1993 | Kahn et al. | 568/617 |
| 5,210,283 | 5/1993 | Kahn et al. | 560/240 |

FOREIGN PATENT DOCUMENTS

| | | |
|---|---|---|
| 0061668 | 3/1982 | European Pat. Off. . |
| 0195910 | 2/1986 | European Pat. Off. . |
| 1226560 | 10/1966 | Germany . |
| 2801578 | 7/1979 | Germany . |
| 2801792 | 7/1979 | Germany . |
| 2916653 | 11/1980 | Germany . |
| 3211635 | 10/1983 | Germany . |
| 3606479 | 9/1987 | Germany . |
| 3641860 | 6/1988 | Germany . |
| 3829735 | 3/1990 | Germany . |
| 3935750 | 5/1991 | Germany . |
| 61-215621 | 9/1986 | Japan . |
| 63-035623 | 2/1988 | Japan . |
| 4306228 | 10/1992 | Japan . |
| 6516827 | 7/1966 | Netherlands . |
| 1512648 | 10/1989 | Russian Federation . |
| 1696439 | 12/1991 | Russian Federation . |

OTHER PUBLICATIONS

German Publication K. Wimmer: Herstellung von Katalysatoren und Mischkatalysatoren, pp. 148–149 and 180–183.

*Primary Examiner*—Samuel A. Acquah
*Attorney, Agent, or Firm*—Keil & Weinkauf

[57] ABSTRACT

Polytetramethylene ether glycol diester of the formula $$R\text{—}CO\text{—}O\text{—}(CH_2CH_2CH_2CH_2\text{—}O)_n\text{—}COR^1$$

wherein R and $R^1$ are identical or different and are alkyl radicals having 1–4 carbon atoms, and n is an integer from 2 to 200, are prepared by polymerizing tetrahydrofuran in the presence of i) an acid-activated polymerization catalyst selected from synthetic amorphous aluminum silicates, zeolite and kaolin, which has been calcined at from 350° to 700° C. before use, ii) a carboxylic anhydride, and iii) from 1 to 10% by weight, based on the weight of the polymerization catalyst, of a metal from the 8th group of the Periodic Table of the Elements as a hydrogenation catalyst.

15 Claims, No Drawings

PROCESS FOR THE PREPARATION OF POLYTETRAMETHYLENE ETHER GLYCOL DIESTER USING AN ALUMINOSILICATE TYPE CATALYST

This application is a continuation of application Ser. No. 08/839,905, filed on Apr. 18, 1997, which is a continuation of application Ser. No. 08/387,828, filed on May 4, 1995, which is a rule 371 of PCT/EP 93/02375, filed on Sep. 3, 1993.

The invention relates to a process for the preparation of polytetramethylene ether glycol (PTMEG) diesters by polymerization of tetrahydrofuran (THF) in the presence of a carboxylic anhydride by means of a catalyst selected from synthetic amorphous aluminum silicate, acid-activated kaolin or zeolite which have been subjected heat treatment prior use.

The polymerization of THF by oxonium ion catalysts became known as the result of the basic work by H. Mewerwein et al. (Angew. Chemie 72, (1960), 927) and is described comprehensively in the monograph "Polytetrahydrofuran" by P. Dreyfuβ, Gordon and Breach Sc. Publishers, New York, London, Paris 1982.

German Offenlegungsschrift DE-A-28 01 792 and German Patent 29 16 653 describe a polymerization process for THF in which the polymerization of THF purified in a separate step is carried out by bleaching earth arranged in a fixed bed in the presence of a carboxylic anhydride. Bleaching earths are naturally occurring aluminium silicates having a cryptocrystalline, three-layer structure of the montmorillonite mineral. The mineral obtained from deposits exhibits physical and chemical properties which vary depending on the origin. In particular, the activity of the catalysts is not constant, but instead varies from batch to batch. In spite of the low price, this is a serious disadvantage for commercial utilization of bleaching earths as catalysts.

The present invention has the object of simplifying the polymerization of THF with respect to the industrial embodiment and making it reproducible. However, the advantages of the process described in German Patent 29 16 653, in particular the fixed-bed catalysis, should be retained.

This object is achieved by a process for the preparation of polytetramethylene ether glycol diesters having the formula $R—CO—O(CH_2—CH_2—CH_2—CH_2—O)_n—COR^1$ in which R and $R^1$ are identical or different and are an alkyl radical having 1–4 carbon atoms, and n is an integer from 2 to 200, by polymerization of tetrahydrofuran in the presence of a polymerization catalyst and in the presence of a carboxylic anhydride, characterized in that a catalyst selected from synthetic amorphous aluminium silicate, acidactivated zeolite or kaolin is used whereby the catalysts are calcined at from 350° to 700° C. before use.

It has been found, surprisingly, that special catalysts which have been pressed to give mouldings and are suspended or introduced into a stationary, fixed catalyst bed convert a mixture of THF and carboxylic anhydride into polybutylene ether glycol carboxylates of low colour index at a high polymerization rate reproducibly and over unusually long periods without the need to subject the THF to pretreatment with highly acidic substances, as is unavoidable when bleaching earth is used as catalyst.

The content of crown ether impurities is extremely low in the process according to the invention. The special catalysts have a virtually unlimited service life and thus improve the environmental acceptability of the process.

Compared with naturally occurring bleaching earth, synthetic, amorphous aluminium silicates have the not inconsiderable advantage that the catalytic activity can be adjusted under the control of the preparation process. Aluminium silicates have acidic centres at the surface. The activity and selectivity of the catalysts depends both on the concentration and on the strength of the acidic centres. For the preparation of amorphous aluminium silicates, which are also employed on an industrial scale as, for example, cracking catalysts in the processing of petroleum, in general a dilute water-glass solution is treated with sulphuric acid. Silica gel forms, to which aluminium sulphate solution and ammonia are added after a certain aging time. The pH is in the slightly acidic range. The alumina silicate gel which forms is filtered off, washed until free of foreign ions, dried and calcined. Brönstedt and Lewis acid centres form in accordance with the equations

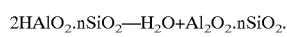

The preparation conditions have a considerable effect on the physical structure of the aluminosilicates. Thus, for example, relatively high silicate concentrations of the water-glass solution and relatively high aging temperatures of the silica gel result in catalysts having a relatively large pore volume and a relatively large specific surface area. A comprehensive discussion of these correlations is given in a paper by K. D. Ashley et al. in Industrial Engineering Chemistry (1952), 44, p. 2857–2863. In order to prepare suitable catalyst mouldings for the process according to the invention, the catalyst powder can, for example, be converted into a paste, extruded to give pellets or converted into beads having a diameter of, for example, 4 mm in bead forming machines. Spherical aluminium silicates are advantageously prepared continuously by mixing the two gel-forming solutions sodium water glass and a sulphuric acid solution of aluminium sulphate at the head of an open suspension tower containing mineral oil as suspension liquid (Ullmanns Encycl.d.techn.Chemie, 3rd Edition, Vol. 9, p. 276). Immediately thereafter, the mixture runs through a distribution cone into the suspension liquid, in which division into droplets takes place. The latter solidify as they sink to give gel beads and are discharged at the base by a stream of water. This is then followed by heat treatment in order to strengthen the structure, base exchange with $Al_2(SO_4)_3$ in order to remove Na ions by Al ions, countercurrent washing for 16 hours in order to remove all soluble salts ($Na_2SO_4$), predrying for 4 hours at 140°–170° C., final drying and conditioning at elevated temperature. Homogeneous, amorphous catalyst beads having, for example, the composition 90% of $SiO_2$, 10% of $Al_2O_3$ and a specific surface area of 500–600 m²/g, a pore volume of about 0.5 cm/g and a mean pore radius of about 50 Å are obtained. Particularly active and preferred catalysts are also obtained, for example, in accordance with the teaching presented in DE-A 18 03 418.

Compared with naturally occurring bleaching earth, the zeolite catalysts have the not inconsiderable advantage that the catalytic activity can be adjusted under the control of the preparation process. Zeolites are crystalline, hydrated aluminium silicates, synthesized or naturally occurring, with a skeleton structure, which normally contain alkali metal or alkaline earth metal cations and can be described by the empirical formula $M_{2/n}O.Al_2O_3/xSiO_2.yH_2O$ ($x \geq 2$; n=valency of the cation M; y=number of water molecules).

These metal cation-containing zeolites, as occur naturally or are formed synthetically, are active polymerization catalysts when converted into the protonated form. To this end, cation exchange, for example by washing with, preferably inorganic acids, such as, for example, hydrohalic acids, sulphuric acid, phosphoric acid, nitric acid or perchloric acid, is necessary. The use of organic carboxylic acids, such as formic acid, acetic acid or trifluoroacetic acid, is likewise possible. Finally, the metal cations can be replaced by ammonium cations, which are converted into Brönstedt acids by calcination:
e.g.:

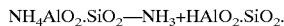

$$NH_4AlO_2.SiO_2 \text{—} NH_3 + HAlO_2.SiO_2.$$

All zeolites in protonated form are suitable as catalysts for the polymerization of THF. However, higher activities than in the case of montmorillonites are only observed for zeolites X and zeolites Y, which are used for the process according to the invention. These are molecular sieve zeolites having pore openings of around 7.1 [Å] and an $SiO_2:Al_2O_3$ molar ratio of from 1:1.5 to 1:2. Zeolites have acidic centres at the surface. The activity and selectivity of the catalysts depend both on the concentration and on the strength of the acidic centres.

Compared with naturally occurring bleaching earths, kaolin catalysts have the not inconsiderable advantage that the catalytic activity can be adjusted under the control of the preparation process.

Kaolins are hydrated aluminium silicates which are widespread in nature and, after treatment with acids, have acidic centres at the surface. The activity and selectivity of the catalysts depend both on the concentration and on the strength of the acidic centres. These can also be generated by calcination of kaolin ammonium compounds, which are then particularly suitable for the process according to the invention.
e.g.:

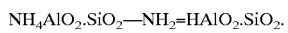

$$NH_4AlO_2.SiO_2 \text{—} NH_2 = HAlO_2.SiO_2.$$

Catalysts for the process according to the invention are obtained, for example, from the product obtained on slurrying of crude kaolin, which is also used, for example, as a paper filler, for the production of ceramic products or in medicine as "Bolus alba". It essentially comprises the triclinic mineral kaclinite, which is ascribed the chemical composition $Al_2O_3.2SiO_2.2H_2O$.

In contrast to the bleaching earths known as polymerization catalysts for THF, which comprise montmorillonite and contain the elements aluminium and silicon in the atomic ratio 1:2, the two elements in kaolinite are in the ratio 1:1.

Due to the higher concentration of acid-forming silicon in montmorillonite, it would have been expected that the better catalysts would not be derived from kaolin, but instead from bleaching earths. Surprisingly, however, precisely the opposite was the case.

Mouldings used according to the invention in the fixed catalyst bed are obtained by washing commercially available kaolin powder with dilute mineral acids, such as, for example, from 1 to 5% strength by weight sulphuric acid, hydrochloric acid, phosphoric acid or ammonium chloride solutions. The acid treatment is followed by washing until neutral, the kaolin in the form of a paste is extruded to give pellets having, for example, diameters of 2–5 mm and lengths of 2–10 mm or is converted into beads having a diameter of, for example, 2–5 mm in bead forming machines, and is subsequently calcined.

The catalysts to be used in the process according to the invention are subjected, before use, to heat treatment or calcination at from 350° C. to 700° C. The heat treatment takes place from 0.1 to 10 hours, preferably from 0.5 to 5 hours. This measure reduces the water content and increases the reactivity. The water content of the catalysts should preferably be less than 1% by weight.

The mouldings employed in the fixed catalyst bed can have, for example, the shape of balls, rings, cylinders or tablets. Spherical mouldings can have diameters of 2–15 mm, preferably 3–5 mm. As cylindrical mouldings, cylinders having a length of 2–6 mm are generally used. Non-spherical or non-cylindrical mouldings generally have a volume which corresponds to that of the cylindrical mouldings.

For the polymerization of THF, only a small amount of catalyst is required. The dry catalyst mouldings are poured into a reactor, for example a tube furnace or shaft furnace. The bed dimensions selected are preferably determined by the need to dissipate the heat of polymerization. It may also be useful to pump all or some of the reaction product over the bed in a circuit in order to ensure isothermal reaction conditions along the furnace in a heat exchanger by cooling or warming. In general, a circuit flow rate which makes up about 3–10 times the reactor volume per hour is sufficient. In the case of continuous polymerization, 0.01–0.1 times the hourly circuit flow rate of fresh feed as THF and carboxylic anhydride is added to the circuit product.

Another suitable reactor for the polymerization according to the invention is a rotating basket filled with catalyst mouldings which is located in a thermostatable reactor which may additionally be equipped with a stirring paddle.

It was unexpected and a technical advance compared with the procedure known hitherto, as described, for example, in German Patent 29 16 653, that the process according to the invention gives products having a very narrow molecular weight distribution and a negligibly small content of less than 0.1% by weight of crown ether impurities. While commercially available polytetramethylene ether glycol (PTMEG) having a molecular weight of 1000 is characterized by the uniformity quotient $M_w/M_n$ of from 1.6 to 1.3, a product is formed according to the invention having the quotient $M_w/M_n$ of from 1.3 to 1.5. This is particularly suitable for the production of elastic polyurethane fibres or thermoplastic polyurethanes having good low-temperature behaviour.

In cases in which THF of low quality has to be employed, it has proven favourable to carry out the polymerization in a hydrogen atmosphere and to charge the catalyst with an addition of from 0.1 to 1.0% by weight of a salt which catalytes the hydrogenation or to admix the catalyst directly with 1–10% by weight of, for example, of a pre-activated nickel catalyst. An example of a catalyst which is highly suitable for this purpose is E 474 TR, 56% by weight of Ni, from Mallinckrodt, Calsicat Div., Pennsylvania, USA.

The essentially anhydrous catalysts do not develop a catalytic action until they are in the presence of the promoter carboxylic anhydride. It is advantageous to use carboxylic anhydrides derived from aliphatic or aromatic poly- and/or preferably monocarboxylic acids having 2–12, preferably 2–8, carbon atoms. Examples which may be mentioned are acetic anhydride, propionic anhydride, butyric anhydride or acrylic or methacrylic anhydride, and succinic anhydride. It is also possible to use mixed anhydrides and anhydride mixtures. Merely for price reasons, preference is given to acetic anhydride.

As mentioned above, the process according to the invention can be used to prepare diesters of polybutylene glycol of any desired degree of polymerization. The carboxylic anhydride concentration of the polymerization mixture determines the degree of polymerization. The lower the anhydride concentration, the higher the molecular weights, and vice versa. The following data may serve as guide values for a reaction temperature of 50° C.:

| Degree of polymerization: 8 | 9 | 10 | 24 | |
|---|---|---|---|---|
| % by weight of acetc anhydride in the polymerization baton: | 10 | 8.8 | 6.3 | 3 |

In order to carry out the polymerization, the catalyst mouldings are brought into contact with the reaction mixture, for example by pumping, in a suitable reaction vessel, for example in the absence of a gas phase by the so-called pool procedure in the preferred embodiment of the polymerization. The heat of reaction formed during the polymerization is dissipated in a suitable manner. In the simplest embodiment of the process according to the invention, the catalyst bed can also be covered by the polymerization mixture and the reaction carried out, for example adiabatically. In the case of very active catalysts, boiling THF limits the maximum temperature to about 65° C. When the reaction is carried out in this way, the polymerization is complete after about 30–60 minutes.

In general, the polymerization is carried out at pressures between 0 and 25 bar and at temperatures between 10 and 60° C. Lower or higher pressures and temperatures bring no advantages.

In most cases, the polymerization is allowed to proceed to complete conversion of the carboxylic anhydride. Depending on the polymerization temperature, 40–75% by weight of the THF employed have then reacted if the polymerization was carried out in the range from 30 to 55° C. Unreacted THF is re-isolated during distillative work-up of the reaction product and can be re-used for later polymerizations without disadvantages.

The polybutylene ether glycol diesters obtained by the process according to the invention can be hydrolyzed by known methods or alternatively transesterified, for example by the method of U.S. Pat. No. 2,499,725 using, for example, methanol. Hydrogenating transesterification, as described in U.S. Pat. No. 4,608,422, is particularly advisable for performance of the process on a large scale. Further methods are described in German Patent 27 60 272, European Patent 0 185 553 and European Patent 0 038 009. The simplest method is to convert the diesters into the diol form by the method, introduced by Adkins, of ester hydrogenation using copper:chromium oxide catalysts. Suitable catalysts are available, for example the copper chromide catalyst G 22 containing about 11% of barium, from Süd-Chemie, AG, Munich, which converts the diesters into PTMEG without losses at 220° C. and a hydrogen pressure of 250 bar without a solvent or alternatively in the presence of methanol or ethanol. This PTMEG, having, for example, molecular weights of 800–3000, is then suitable for the preparation of polyesters or polyurethanes. Only the products obtained by the process according to the invention can be hydrogenated by the Adkins method to give products of sufficiently low residual ester number of 1 mg of KOH/g. PTMEG diacetates prepared by other polymerization methods (for example by bleaching-earth catalysis) give polytetramethylene ether glycols having residual ester numbers of greater than 1 mg of KOH/g.

The examples are below are intended to illustrate the process according to the invention in greater detail without representing a limitation. Parts are parts by weight; they have the same relationship to parts by volume as does the kilogram to the liter.

EXAMPLE 1

Kaolin powder from J. T. Baker Chemical Company, USA, was covered with a 10% strength by weight ammonium chloride solution, and the excess solution was sucked off in a Büchner funnel. This treatment was repeated three times, and the kaolin was then washed with distilled water. The moist dough was shaped into beads having a diameter of 4 mm, which were then calcined at 650° C. for 2 hours and cooled in a desiccator, 150 cm$^3$ of the water-free kaolin beads are introduced into a Duran glass laboratory bottle from Schott, Mainz, pre-warmed to 50° C. in a water bath and covered with 300 g of a mixture comprising 91.5% by weight of THF and 8.5% by weight of acetic anhydride. The bottle, rightly sealed with a polypropylene screw cap, is slowly rotated about the longitudinal axis for 1 hour in a water bath at 50° C. in order to keep the catalyst bed in gentle motion.

The reaction mixture was then decanted off from the catalyst and analyzed. The acid number of the reaction product indicated an approximately 99% conversion of the acetic anhydride.

The unreacted THF was evaporated off at 150° C. and 5 mbar for the resultant polytetramethylene ether glycol diacetate, which was present in the reaction solution in an amount of 56% by weight. The hydrolysis number of the diester if 152.5 mg of KOH/g, which corresponds to a molecular weight of 734 g/mol. Transesterification by means of the same amount of methanol in the presence of, for example, 0.01% by weight of sodium methoxide gives PTMEG having a hydroxyl number of 173 mg of KOH/g and a colour index of 5 APHA. The product exhibits a very narrow molecular weight distribution. The heterogeneity quotient (polydispersity) $M_w/M_n$ is only 1.28. The content of oligomeric cyclic ethers is less than 0.01% by weight.

EXAMPLE 2

The polymerization is carried out in the experimental set-up described in Example 1 at 50° C. using commercial kaolin from J. T. Baker Chemical Comp., USA. The catalyst in cylindrical form with the dimensions 3×4 mm had previously been impregnated four times with 5% strength by weight aqueous hydrochloric acid and dried at 650° C. for two hours to constant weight. In addition, 15 cm$^3$ of catalyst E-474TR containing 56% by weight of nickel, reduced and stabilized, from Malinckrodt, Calsicat Div., Pennsylvania, USA, were added to the catalyst pellets in order to improve the quality of the THF.

For the polymerization, a 3% strength by weight acetic anhydride solution THF is used. The free space in the polymerization bottle contained a hydrogen atmosphere. After polymerization for 2.3 hours, more than 99% of the acetic anhydride has reacted, and the polymer solution contains 53% by weight of PTMEG diacetate having an ester number of 61.2 (corresponds to a molecular weight of 1824 g/mol). By hydrogenation on a fixed bed using the pool procedure, it is converted into PTMEG having a hydroxyl number of 64.1 (molecular weight 750 g/mol) at 220° C. and 250 bar of hydrogen in 60% strength by weight methanol solution using barium oxide-activated copper chromide catalyst C22, reduced and stabilized, from the manufacturer Süd-Chemie AG, Munich. The polymer is very uniform and exhibits the polydispersity $M_w/M_n$=1.8 in GPLC analysis. The colour index is 5 APHA. A conversion of only 50% by weight after a polymerization time of 2.5 hours is achieved if the kaolin has not been impregnated with 5% strength by weight of hydrochloric acid, but instead with 8% strength by weight of sulphuric acid, and then washed and activated. The PTMEG obtainable from the polytetrahydrofuran diacetate then has a molecular weight of 1720 g/mol and a distribution width of $M_w/M_n=1.95$.

EXAMPLE 3

The homogeneous, amorphous silicon dioxide/aluminium oxide catalyst used in this example was prepared as follows in accordance with the teaching of DE-A 18 03 418 (Example 1 DE-A 18 03 418):

1560 cm$^3$ of (EtO)$_4$Si containing 0.27 g of SiO$_2$/cm$^3$ were dissolved in 4200 cm$^3$ of a solution containing 90% by volume of C$_2$H$_5$OH and 10% by volume of CH$_3$OH. The alcoholic solution was mixed with 314 cm$^3$ of a basic aluminium chloride which had been prepared by reacting in AlCl$_3$ solution with aluminium metal powder under reflux (1.17 g/cm$^3$ and 13.6% by weight of Al$_2$O$_3$). The silicon-containing solution and the basic aluminium chloride were mixed with one another at room temperature and then introduced into a covered container in an oven and kept therein at a temperature of from 65.5° to 71.1° C. overnight. After about 8 hours, a gel was obtained. The gel was aged for 20 hours in an ammonium hydroxide solution, a dilute ammonium hydroxide solution being added to increase the pH to from 8 to 9. The modified gel was washed with a continuous 20 cm$^3$/min stream of water until free of chloride, and dried for 16 hours at 138° C. and for 2 hours at 171° C., and then calcined for 2 hours at a temperature of 650° C. The resultant aluminosilicate comprising 90% of SiO$_2$ and 10% Al$_2$O$_3$ was comminuted, and a screen fraction of 3–5 mm was then used for the polymerization. 250 cm$^3$ of the anhydrous aluminosilicate were introduced into a Duran glass laboratory bottle from Schott, Mainz, prewarmed in a water bath at 50° C. and covered with 300 g of a mixture comprising 9.15% by weight of THF and 8.5% by weight of acetic anhydride. The bottle tightly sealed with a polypropylene screw cap is slowly rotated about the longitudinal axis for 1 hour in a water bath at 50° C. in order to keep the catalyst bed in gentle motion.

The reaction mixture was then decanted from the catalyst and analyzed. The acid number of the reaction product indicated an acetic anhydride conversion of about 99%.

The unreacted THF was evaporated off at 150° C. and 5 mbar from the resultant polytetramethylene ether glycol diacetate, which was present in the reaction solution to the extent of 56% by weight. The hydrolysis number of the diester is 152.6 mg of KOH/g, which corresponds to a molecular weight of 734 g/mol. Transesterification using the same amount of methanol in the presence of, for example, 0.01% by weight of sodium methoxide gives PTMEG having a hydroxyl number of 173 mg of KOH/g and a colour index of 5 APHA. The product exhibits a very narrow molecular weight distribution. The heterogeneity quotient (polydispersity) $M_w/M_n$ is only 1.28. The content of oligomeric cyclic ethers is less than 0.01% by weight.

EXAMPLE 4

The polymerization is carried out in the experimental set-up described in Example 1 at 50° C. using commercial silicon oxide/aluminium oxide catalyst (manufacturer: J. T. Baker Chemical Comp., USA; 87% by weight of SiO$_2$, 13% by weight of Al$_2$O$_3$). The catalyst in cylindrical form with the dimensions 3×4 mm had previously been impregnated with 7% strength by weight aqueous hydrochloric acid and dried for two hours at 550° C. to constant weight. In addition, 25 cm$^3$ of catalyst E-474TR containing 56% by weight of nickel, reduced and stabilized, from Malinckrodt, Calsicat Div., Pennsylvania, USA, was added to the aluminosilicate to improve the quality of the THF.

For the polymerization, a 3% strength by weight acetic anhydride solution in THF is used. The free space in the polymerization bottle contained a hydrogen atmosphere. After polymerization for 2.5 hours, more than 99% of the acetic anhydride has reacted, and the polymer solution contains 53% by weight of PTMEG diacetate having an ester number of 61.2 (corresponds to a molecular weight of 1824 g/mol). By hydrogenation on a fixed bed using the pool procedure, it is converted into PTMEG having a hydroxyl number of 64.1 (molecular weight 1750 g/mol) in 40% strength by weight methanol solution on barium oxide-activated copper chromite catalyst G22—reduced and stabilized—(manufacturer: Süd-Chemie AG, Munich) at 220° C. and 250 bar of hydrogen. The polymer is very uniform and exhibits a polydispersity of $M_w/M_n=1.8$ in GPLC analysis. The colour index is 5 APHA. A conversion of only 50% by weight after a polymerization time of 2.5 hours is achieved if the aluminosilicate was not impregnated and activated with the 7% strength by weight of hydrochloric acid, but instead with a 10% strength by weight ammonium chloride solution. The PTMEG obtainable from the polytetrahydrofuran diacetate then has a molecular weight of 1720 g/mol and a distribution width of $M_w/M_n=1.95$.

EXAMPLE 5

An anhydrous zeolite X having the approximate composition Na$_{86}$ (AlO$_2$)$_6$ (SiO$_2$)$_{87}$·260 H$_2$O (manufacturer J. T. Baker Chemical Comp., USA) is introduced into a Duran glass laboratory bottle from Schott, Mainz, prewarmed to 50° C. in a water bath and covered with 300 g of a mixture comprising 91.5% by weight of THF and 8.5% by weight of acetic anhydride. The bottle, tightly sealed with a polypropylene screw cap, is slowly rotated about the longitudinal axis for 1 hour in a water bath at 50° C. in order to keep the catalyst bed in gentle motion. The catalyst had previously been converted into the protonated form by washing with 3% strength hydrochloric acid and drying at 550°.

The reaction mixture was then decanted from the catalyst and analyzed. The acid number of the reaction product indicated an acetic anhydride conversion of approximately 99%.

The unreacted THF was evaporated off at 150° C. and 5 mbar from the resultant polytetramethylene ether glycol diacetate, which was present in the reaction solution to the extent of 56% by weight. The hydrolysis number of the diester if 152.6 mg of KOH/g, which corresponds to a molecular weight of 734 g/mol. Transesterification using the same amount of methanol in the presence of, for example, 0.01% by weight of sodium methoxide gives PTMEG having a hydroxyl number of 173 mg of KOH/g and a colour index of 5 APHA. The product exhibits a very narrow molecular weight distribution. The heterogeneity quotient (polydispersity) $M_w/M_n$ is only 1.28 and thus exhibits an extremely narrow molecular weight distribution. The content of oligomeric cyclic ethers is less than 0.01% by weight.

EXAMPLE 6

The polymerization is carried out in the experimental set-up described in Example 1 at 50° C. using a commercial zeolite catalyst (manufacturer: J. T. Baker Chemical Comp., USA; 15% by weight of $SiO_2$, 42% by weight of $NaAlO_2$, 43% by weight of $H_2O$). The catalyst in cylindrical form with the dimensions 4×4 mm had previously been washed with 5% strength by weight aqueous hydrochloric acid and dried for 2 hours at 550° C. to constant weight. In addition, 25 cm³ of catalyst E-474TR containing 56% by weight of nickel, reduced and stabilized, from Mallinckrodt, Calsicat Div., Pennsylvania, USA, had been added to the catalyst to improve the quality of THF.

For the polymerization, a 3% strength by weight acetic anhydride solution in THF is used. The free space in the polymerization bottle contained a hydrogen atmosphere. After polymerization for 2.5 hours, more than 99% of the acetic anhydride has reacted, and the polymer solution contains 53% by weight of PTMEG diacetate having an ester number of 61.2 (corresponds to a molecular weight of 1824 g/mol). By hydrogenation on a fixed bed using the pool procedure, it is converted into PTMEG having a hydroxyl number of 64.1 (molecular weight 1750 g/mol) in 40% strength by weight methanol solution on barium oxide-activated copper chromite catalyst G22, reduced and stabilized (manufacturer: Süd-Chemie AG, Munich), at 220° C. and 250 bar of hydrogen. The polymer is very uniform and exhibits a polydispersity $M_w/M_n$=1.8 in GPLC analysis. The colour index is 5 APHA.

A conversion of only 50% by weight after a polymerization time of 2.5 hours is achieved if the zeolite has not been impregnated and activated with the 5% strength by weight hydrochloric acid, but instead with a 10% strength by weight ammonium chloride solution. The PTMEG obtainable from the polytetrahydrofuran diacetate then has a molecular weight of 1720 g/mol and a distribution width of $M_w/M_n$=1.95.

I claim:

1. A process for the preparation of polytetramethylene ether glycol diester of the formula

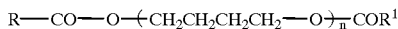

in which R and $R^1$ are identical or different and are alkyl radicals having 1–4 carbon atoms, and n is an integer from 2 to 200, which process comprises: polymerizing tetrahydrofuran in the presence of
   i) an acid-activated polymerization catalyst,
   ii) a carboxylic anhydride, and
   iii) a hydrogenation catalyst,
in a hydrogen atmosphere at atmospheric or superatmospheric pressure, wherein the acid-activated polymerization catalyst is selected from the group consisting of synthetic amorphous aluminium silicates, zeolite and kaolin, said polymerization catalyst having been calcined at from 350° to 700° C. before use, and wherein the hydrogenation catalyst is a metal from the 8th group of the periodic Table of the Elements, said hydrogenation catalyst being present in an amount of from 1 to 10% by weight, based on the weight of the polymerization catalyst.

2. The process defined in claim 1, wherein the carboxylic anhydride used is acetic anhydride.

3. The process defined in claim 1, wherein the polymerization catalyst contains less than 1% by weight of water.

4. The process defined in claim 1, wherein the polymerization catalyst is calcined for from 0.1 to 10 hours.

5. The process defined in claim 1, wherein the polymerization catalyst is arranged in a fixed bed, and the mixture of tetrahydrofuran and carboxylic anhydride is passed over this fixed bed.

6. The process defined in claim 1, wherein the polymerization catalyst is employed in the form of beads, rings, tablets, cylinders or granules having a diameter of 1 to 8 mm.

7. The process defined in claim 1, wherein the polymerization catalyst is a calcined and acid-activated kaolin.

8. The process defined in claim 1, wherein the polymerization catalyst is a calcined and acid-activated zeolite.

9. The process defined in claim 1, wherein the polymerization catalyst is a calcined and acid-activated amorphous aluminium silicate.

10. The process defined in claim 1, wherein the hydrogenation catalyst is applied in form of a salt of a metal which catalyses hydrogenation.

11. The process define din claim 1, wherein the hydrogenation catalyst is a pre-activated nickel catalyst.

12. The process defined in claim 1, which is carried out at from 0 to 25 bar.

13. The process defined in claim 1, which is carried out at from 10 to 60° C.

14. The process defined in claim 1, for the preparation of polytetramethylene ether glycol diesters having a molecular weight quotient $M_w/M_n$ of from 1.3 to 1.5.

15. The process defined in claim 1, for the preparation of polytetramethylene ether glycol diesters comprising less than 0.1% by weight of crown ether impurities.

* * * * *

UNITED STATES PATENT AND TRADEMARK OFFICE
CERTIFICATE OF CORRECTION

PATENT NO.: 6,069,226

DATED: May 30, 2000

INVENTOR(S): Monika MUELLER

It is certified that error appears in the above-identified patent and that said Letters Patent is hereby corrected as shown below:

On the cover page, item [30], "Sep. 4, 1997" should be --Sep. 4, 1992--.

Col. 10, claim 11, line 35, "defin din" should be --defined in --.

Signed and Sealed this

Twentieth Day of March, 2001

*Attest:*

NICHOLAS P. GODICI

*Attesting Officer*   *Acting Director of the United States Patent and Trademark Office*